(12) United States Patent
Jee et al.

(10) Patent No.: US 7,873,189 B2
(45) Date of Patent: Jan. 18, 2011

(54) FACE RECOGNITION BY DIVIDING AN IMAGE AND EVALUATING A SIMILARITY VECTOR WITH A SUPPORT VECTOR MACHINE

(75) Inventors: Hyung Keun Jee, Daejeon (KR); Yun Su Chung, Daejeon (KR); Jang Hee Yoo, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1169 days.

(21) Appl. No.: 11/516,090

(22) Filed: Sep. 6, 2006

(65) Prior Publication Data

US 2007/0122009 A1 May 31, 2007

(30) Foreign Application Priority Data

Nov. 26, 2005 (KR) ............... 10-2005-0113848

(51) Int. Cl.
*G06K 9/00* (2006.01)
*G06K 9/62* (2006.01)
(52) U.S. Cl. ............... 382/118; 382/159
(58) Field of Classification Search ........... 382/115, 382/117, 118, 155, 159, 160, 224, 228; 706/10, 706/12, 14
See application file for complete search history.

(56) References Cited

U.S. PATENT DOCUMENTS

| 6,044,168 | A * | 3/2000 | Tuceryan et al. | 382/118 |
| 6,600,830 | B1 * | 7/2003 | Lin et al. | 382/118 |
| 6,879,709 | B2 * | 4/2005 | Tian et al. | 382/118 |
| 7,187,786 | B2 * | 3/2007 | Kee | 382/118 |
| 2005/0180611 | A1 * | 8/2005 | Oohashi et al. | 382/118 |

FOREIGN PATENT DOCUMENTS

| JP | 2004-054960 | 2/2004 |
| KR | 20040039788 | 5/2004 |
| KR | 1020040039788 | 5/2004 |
| KR | 1020050045773 | 5/2005 |

(Continued)

OTHER PUBLICATIONS

Kim et al. (Jul. 2003) "Real-time face verification using multiple feature combination and a support vector machine supervisor." Proc. 2003 IEEE Int'l Conf. on Acoustics, Speech, and Signal Processing, vol. 2 pp. 353-356.*

(Continued)

*Primary Examiner*—Brian P Werner
*Assistant Examiner*—Barry Drennan
(74) *Attorney, Agent, or Firm*—Ladas & Parry LLP

(57) ABSTRACT

A face recognition and apparatus are provided. According to the method, an SVM classifier is created through machine learning on the basis of a degree of similarity of a divided facial image, and a facial image to be authenticated is normalized to a predetermined size using a center between two eyes. The normalized image is divided into more than one image in horizontal and vertical directions, respectively. Next, predetermined characteristic vectors from the divided images are extracted and a similarity vector based on a degree of similarity with respect to a registered characteristic vector is created. The similarity vector is input to the SVM classifier, so that authentication is performed.

8 Claims, 5 Drawing Sheets

FOREIGN PATENT DOCUMENTS

| KR | 1020050050466 | 5/2005 |
|----|---------------|--------|
| KR | 1020050054394 | 6/2005 |

OTHER PUBLICATIONS

Belhumeur et al. (Jul. 1997) "Eigenfaces vs. Fisherfaces: Recognition using class-specific linear projection." IEEE Trans. on Pattern Analysis and Machine Intelligence, vol. 19 No. 7, pp. 711-720.*

Heisele et al. (Jul. 2003) "Face recognition: component-based versus global approaches." Computer Vision and Image Understanding, vol. 91 pp. 6-21.*

Gottumukkal et al. (Dec. 2003) "An improved face recognition technique based on modular PCA approach." Pattern Recognition Letters, vol. 25 pp. 429-436.*

Pentland et al. (Jun. 1994) "View-based and modular eigenspaces for face recognition." Proc. 1994 IEEECS Conf. on Computer Vision and Pattern Recognition, pp. 84-91.*

Burges, C.J.C. (Jun. 1998) "A tutorial on support vector machines for pattern recognition." Data Mining and Knowledge . Discovery, vol. 2 No. 2 pp. 121-167.*

Graf et al. (Sep. 2001) "Normalization in support vector machines." LNCS vol. 2191, pp. 277-282.*

* cited by examiner

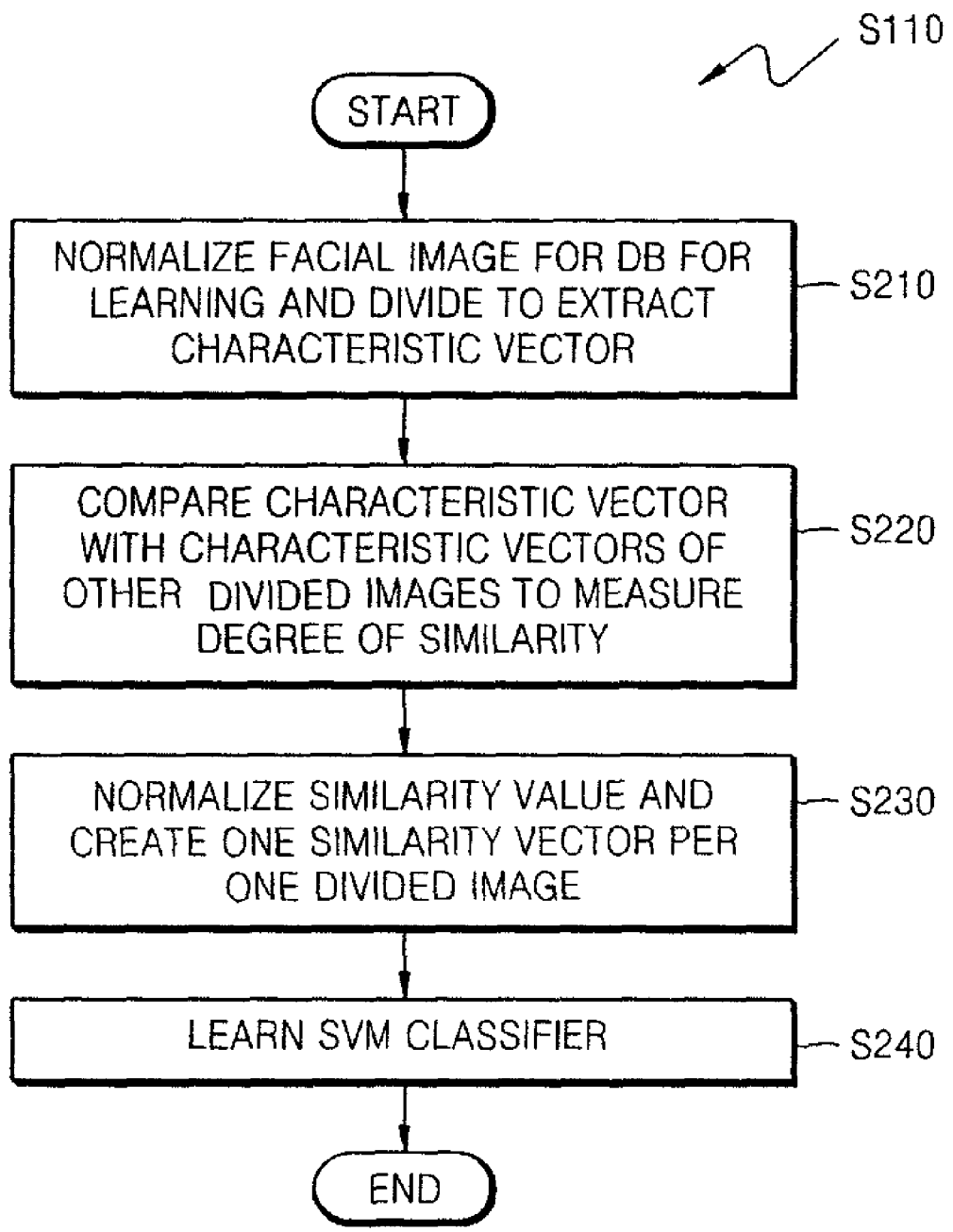

FACE RECOGNITION BY DIVIDING AN IMAGE AND EVALUATING A SIMILARITY VECTOR WITH A SUPPORT VECTOR MACHINE

CROSS-REFERENCE TO RELATED PATENT APPLICATION

This application claims the benefit of Korean Patent Application No. 10-2005-0113848, filed on Nov. 26, 2005, in the Korean Intellectual Property Office, the disclosure of which is incorporated herein in its entirety by reference.

BACKGROUND OF THE INVENTION

1. Field of the Invention

The present invention relates to a face recognition method and apparatus, capable of recognizing a user's face to register and authenticate the user, and more particularly, to a face recognition method and apparatus capable of dividing a normalized facial image into three sections in horizontal and vertical directions, respectively, applying principal component analysis (PCA) to the divided six images to reduce the dimensions of data of the image, applying linear discriminant analysis (LDA) to the divided six images to extract characterizing vectors, and then making one vector using six similarity degree values obtained by comparing the characterizing vectors with a characterizing vector registered in advance, to identify a user through a learned support vector machine (SVM).

2. Description of the Related Art

A characteristic vector capable of identifying a user is extracted from a facial image in order to recognize the user's face. Methods of extracting a characteristic vector can use local features or overall characteristics of a face. Methods using local features extract the characteristic vector using the shapes, locations, and correlation of characteristic parts such as eyes, nose, and mouth. Methods using overall characteristics extract the characteristic vector using the entire face, usually by PCA or LDA.

However, since PCA and LDA methods project the entire facial image onto a transform matrix, they are complex and need a large memory capacity, and are difficult to use in an embedded environment or other environment where the memory capacity and processor are limited. Also, since PCA and LDA methods use the characteristics of the entire face, there is a limitation in describing a partial feature of a face.

Also, authentication methods using an SVM must be learned for each person during registration, so a system should store a plurality of people's images required for learning the SVM, and thus a large capacity memory and much time are required.

SUMMARY OF THE INVENTION

The present invention provides a face recognition method and apparatus capable of reducing a memory capacity and calculation complexity in an embedded environment having limited resources, efficiently extracting facial characteristics, and using one learned SVM classifier identifying an authorized user and an unauthorized user without learning a SVM classifier for each individual during registration, thereby reducing memory capacity and time.

According to an aspect of the present invention, there is provided a face recognition method including: creating a support vector machine classifier through machine learning on the basis of a similarity degree of a divided facial image; normalizing a facial image to be authenticated to a predetermined size using a center between two eyes and dividing the normalized image into more than one image in horizontal and vertical directions, respectively; extracting predetermined characteristic vectors from the divided images and creating a similarity vector based on a degree of similarity with respect to a registered characteristic vector; and inputting the similarity vector to the SVM classifier to perform authentication.

According to another aspect of the present invention, there is provided a face recognition apparatus including: an SVM providing an SVM model outputting one of two integers depending on a degree of similarity between divided facial images; an image division unit dividing an input image to be authenticated into more than one image in horizontal and vertical directions, respectively, and outputting the same; a similarity vector creating unit extracting a characteristic vector for each of the divided images, comparing the extracted characteristic vector with a characteristic vector registered in advance, and measuring a degree of similarity between the extracted characteristic vector and registered characteristic vector to output a result as one similarity vector; and an authentication unit applying the similarity vector to the SVM model to perform face recognition.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart illustrating in more detail a process S100 of creating an SVM classifier in the face recognition method according to the present invention;

DETAILED DESCRIPTION OF THE INVENTION

The present invention will now be described more fully with reference to the accompanying drawings, in which exemplary embodiments of the invention are shown. The method and apparatus will be described simultaneously for convenience.

Figure 1:
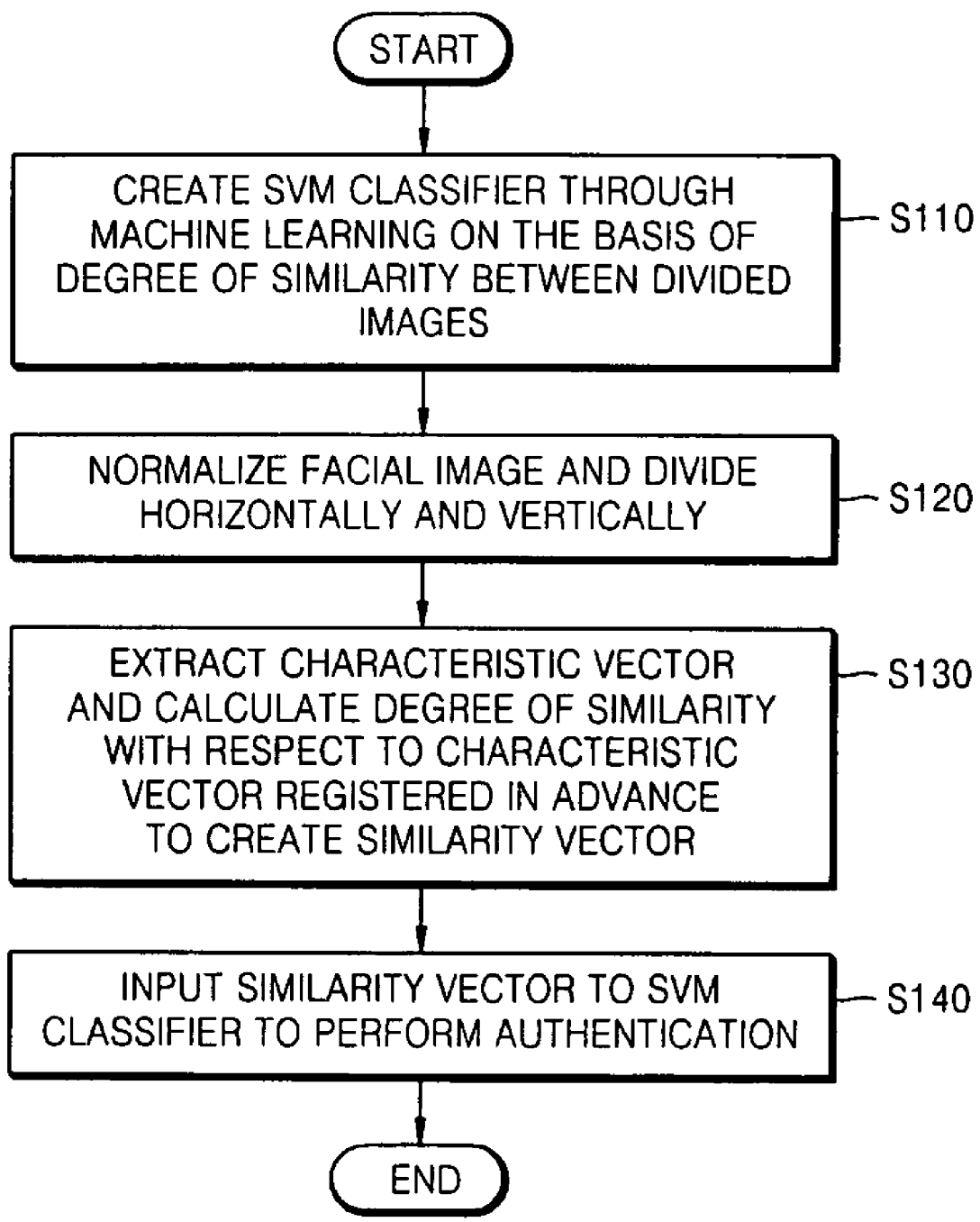
FIG. 1 is a flowchart illustrating a face recognition method according to the present invention.
Figure 3A:
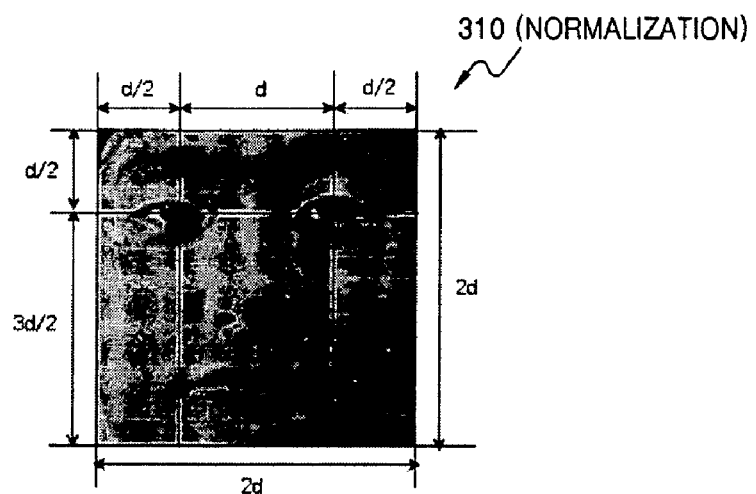
FIG. 3A illustrates a normalization process for a facial region in the face recognition method according to the present invention.
Figure 3B:
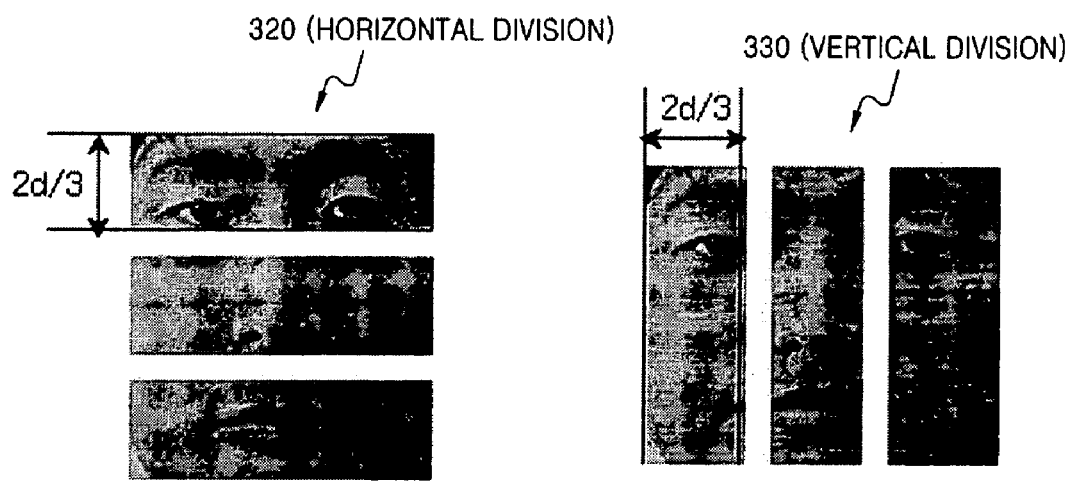
FIG. 3B illustrates a division process for a facial region in the face recognition method according to the present invention.
Figure 4:
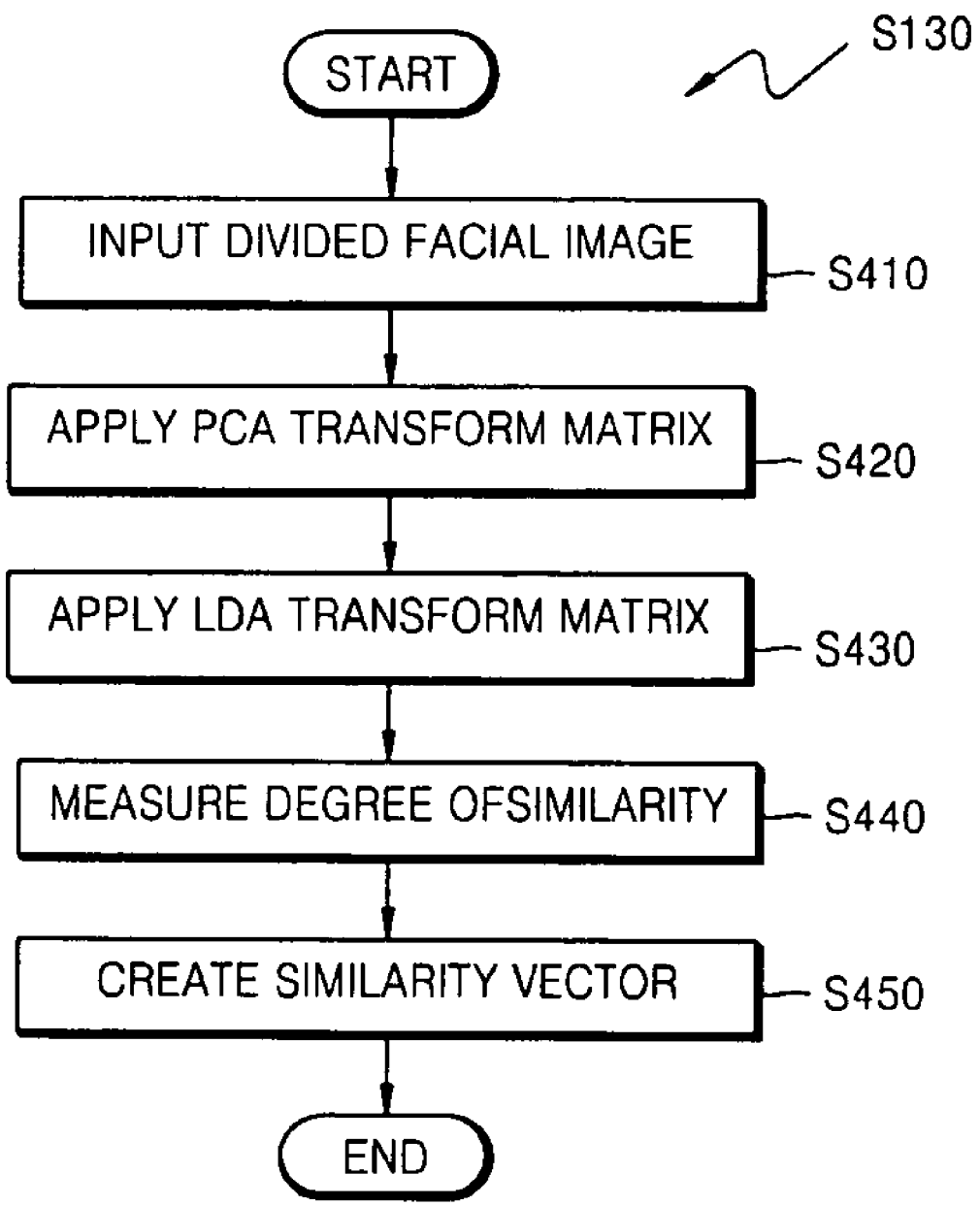
FIG. 4 is a flowchart illustrating a process S130 of creating a degree of similarity characteristic vector after extracting characteristics using PCA/LDA in the face recognition method according to the present invention.
Figure 5:
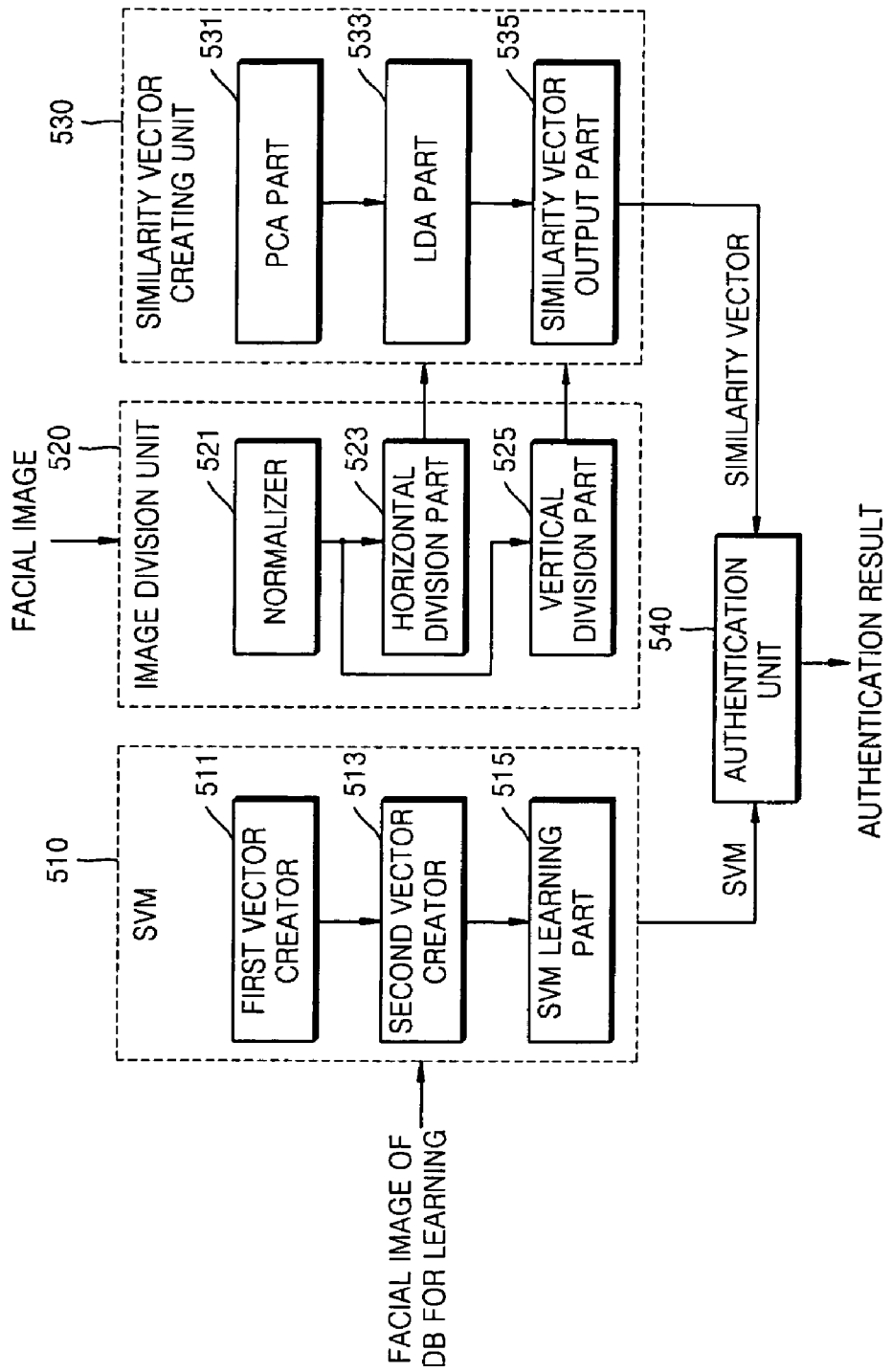
FIG. 5 is a block diagram of a face recognition apparatus according to the present invention.

FIG. 1 is a flowchart illustrating a face recognition method according to an embodiment of the present invention, and FIG. 2 is a flowchart illustrating in more detail a process S100 of creating an SVM classifier in the face recognition method according to an embodiment of the present invention. FIG. 3A illustrates a normalization process for a facial region in the face recognition method according to an embodiment of the present invention, and FIG. 3B illustrates a division process for a facial region in the face recognition method according to an embodiment of the present invention. FIG. 4 is a flowchart illustrating a process S130 of creating a similarity degree characteristic vector after extracting characteristics using PCA/LDA in the face recognition method according to an embodiment of the present invention. FIG. 5 is a block diagram of a face recognition apparatus according to an embodiment of the present invention.

First, to perform the face recognition method according to an embodiment of the present invention, an SVM 510 creates an SVM classifier required for authentication in operation S110, which will be described in more detail with reference to FIG. 2. A first vector creator 511 receives a facial image from a database containing a plurality of facial images per one people. The images contained in the database are normalized to a predetermined size and divided. Then, PCA and LDA are sequentially applied to each image to extract a characteristic vector in operation S210. Then, six characteristic vectors are created for one image. A second vector creator 513 receives these six characteristic vectors and compares them with the characteristic vectors of all the other images to measure a degree of similarity in operation S220. The measured degrees of similarity are normalized to a range between −1 and 1, and the normalized degrees of similarity are used to make one similarity vector for each image. At this point, two similarity vectors are stored, one obtained by comparing a user's image with his own image, and the other obtained by comparing a user's image with other people's image in operation S230.

An SVM learning part 515 receives stored similarity vectors for each SVM, and outputs 1 for a similarity vector obtained by comparing a user's image and his own image or −1 for a similarity degree vector obtained by comparing a user's image with other people's image. The SVM learning part 515 programs an SVM in operation S240.

The SVM classifier created by learning outputs a positive value for an authenticated user and outputs a negative value for a stranger. It is possible to authenticate a facial image using the created SVM.

When a facial image is obtained from an image input apparatus including a camera, the facial image is normalized and divided horizontally and vertically. A facial region and a center of two eyes are extracted from the obtained image. When detection of the facial region fails during this process, the initial operation is performed to obtain a new image, and the above operations are repeated until the facial region is detected from the obtained image.

Next, the facial region is normalized using the above-extracted center of the two eyes. Since the size or the direction of an object to be recognized may be different, it is necessary to normalize the object to a standard size and direction so that recognition may be easily performed.

Next, an image division unit 520 divides the normalized candidate facial regions into three equal regions in horizontal and vertical directions respectively in operation S120.

FIG. 3A illustrates a process of normalizing (310) a facial image by detecting candidate facial regions with focusing on a detected candidate region of a pair of eyes in the face recognition method. The normalization of the candidate facial region is performed as follows.

The normalizer 521 rotates an image the slope of a line connecting centers of the detected two eyes to correct the slope of the image, and clips the facial image. The image is clipped according to the distance d between the eyes, so that the right and left sides are clipped to d/2 outside the eyes, the top is clipped to d/2 above the eyes, and the bottom is clipped to 3d/2 below the eyes, to create a square facial image with height and width both equal to 2d.

After that, the clipped facial image is sampled to a reference size, e.g. a 60×60 pixels.

Next, FIG. 3B illustrates the process by which a horizontal division part 523 and a vertical division part 525 divide a normalized facial image in a horizontal direction 320 and a vertical direction 330, respectively.

The horizontal division part 523 divides the normalized image into three horizontal parts of equal size, and the vertical division part 525 equally divides the normalized image into three vertical parts of equal size, to create six divided images are created.

Referring to FIG. 3B, the three horizontal divided images respectively represent an eyebrows and eyes region, a nose region, and a mouth region, and the three vertical divided images respectively represent a left eye region, a nose region, and a right eye region.

The advantage of dividing the facial image in this manner is that not only the overall characteristics of the face are described, but also elements describing local features of the face can be expressed when applying PCA or LDA to an image, so that better recognition performance is achieved. Also, since the divided images are smaller than the original, the memory capacity and calculation complexity are reduced.

A similarity vector creating unit 530 extracts characteristic vectors of the divided images, and calculates a degree of similarity between the extracted characteristic vectors and a characteristic vector registered in advance, to create a similarity vector in operation S130, which will be described in more detail with reference to FIG. 4.

A PCA part 531 receives the six divided facial images in operation S410 and applies PCA to the divided images to reduce the dimensions of data of the divided images in operation S420. An LDA part 533 applies LDA to the divided images to extract six characteristic vectors. A similarity vector output part 535 compares the six extracted characteristic vectors with the characteristic vector registered in advance, to calculate a degree of similarity in operation S440, and combines the six measured degrees of similarity to create one similarity degree vector in operation S450.

The process of creating the characteristic vectors will be described in more detail. The divided images are projected onto a PCA transform matrix generated in advance, so that the dimensions of the data are reduced. After that, the data is projected onto an LDA transform matrix generated in advance, to extract the six characteristic vectors. The LDA is similar to the PCA, and is a method of obtaining a transform matrix that maximizes dispersion between images belonging to different groups and minimizes dispersion between images contained in the same group.

Lastly, an authentication unit 540 inputs the extracted similarity vector to the SVM to determine whether the user is an authorized user in operation S450. It is possible to identify a user by inputting the extracted similarity vector to the learned (trained) SVM classifier. Usually if face recognition is performed using the SVM, the SVM classifier should be created for each individual using the characteristic vectors extracted during registration. However according to the present invention, it is possible to reduce the necessary memory capacity and registration time by performing authentication using one learned SVM classifier.

Since a facial region is divided into a plurality of regions which effectively represent the facial features, before processing, reliable face recognition may be achieved with reduced memory capacity and calculation complexity.

The invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, a font ROM data according to the present invention may be realized as computer-readable code on the computer-readable recording medium such as ROM, RAM, CD-ROMs, magnetic tapes, hard disks, floppy disks, flash memory, and optical data storage devices.

As described above, since the face recognition method and apparatus divide the facial region horizontally and vertically to extract characteristics, it is possible to reduce the memory capacity and calculation complexity. Also, the present invention effectively expresses even the characteristics of local facial features as well as the overall characteristics of the face, allowing more accurate face recognition.

Furthermore, since the SVM classifier for each individual does not need to be created during registration according to the present invention, processing speed is improved and less memory capacity is needed. Accordingly, it is possible to realize a faster and more reliable face recognition system even in an embedded environment having limited resources.

Lastly, the face recognition method and apparatus according to the present invention may be included in a miniature device such as a smart card or a mobile apparatus, and used for a variety of fields requiring identification.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A face recognition method comprising:
creating an SVM (support vector machine) classifier through machine learning on the basis of a degree of similarity between stored facial images in a database;
normalizing a measured facial image to a predetermined size and subsequently dividing the normalized measured facial image along horizontal and vertical directions into at least six sub-divided images of the normalized measured facial image, wherein dividing the normalized measured facial image comprises:
dividing the normalized measured facial image into three equal regions horizontally which respectively represent an eye region, a nose region, and a mouth region and which each have a height equal to ⅔ the distance between the eyes; and
dividing the normalized measured facial image into three equal regions vertically which respectively represent a left eye region, a nose region, and a right eye region and which each have a width equal to ⅔ the distance between the eyes;
extracting characteristic vectors from each of the sub-divided images of the normalized measured facial image and creating a similarity vector based on a degree of similiarity between registered characteristic vectors associated with at least one of the stored facial images and that of the extracted characteristic vectors of the normalized measured facial image, wherein the extracted and registered characteristic vectors are obtained by applying PCA (principal component analysis) to reduce the dimensions of data of images, and then applying LDA (linear discriminant analysis), wherein six extracted characteristic vectors are created from six sub-divided images of the normalized measured facial image; and
inputting the similarity vector to the SVM classifier to perform authentication of the measured facial image.

2. The method of claim 1, wherein creating of the SVM classifier comprises:
normalizing a stored facial image of the stored facial images to the predetermined size, dividing along horizontal and vertical directions the normalized stored facial image into a plurality of sub-divided images of the normalized stored facial image, and extracting characteristic vectors from the sub-divided images of the normalized stored facial image;
comparing the characteristic vectors from the normalized stored facial image against registered characteristic vectors of other divided images of the stored facial images to measure the degree of similarity; and
normalizing the measured degree of similarity of the compared characteristic vectors between −1 and +1.

3. The method of claim 1, wherein six extracted characteristic vectors are created from six sub-divided images of the normalized measured facial image.

4. The method of claim 1, wherein normalizing of the measured facial image comprises:
rotating the measured facial image using the slope of a line connecting centers of two eyes to correct an overall slope of the measured facial image; and
clipping the measured facial image using the distance between the two eyes as a reference and sampling the clipped facial image into the predetermined size to normalize the measured facial image.

5. The method of claim 1, wherein extracting of the characteristic vectors comprises:
projecting the sub-divided images onto a PCA transform matrix to reduce the dimensions of the sub-divided images;
projecting the sub-divided images onto an LDA transform matrix to extract the extracted characteristic vectors; and
comparing the extracted characteristic vectors with registered characteristic vectors which are registered in advance to measure the degree of similarity, and to create the similarity vector.

6. A face recognition apparatus having a processor and memory comprising:
a support vector machine (SVM) configured to create an SVM classifier through machine learning on the basis of a degree of similarity between stored facial images in a database;
an image division unit configured to normalize a measured facial image to a predetermined size and subsequently divide the normalized measured facial image along horizontal and vertical directions into a plurality of at least six sub-divided images of the normalized measured facial image, wherein the image division unit comprises:
a normalizer configured to rotate the measured facial image using the slope of a line connecting centers of two eyes to correct an overall slope of the measured facial image, to clip the measured facial image using the distance between the two eyes as a reference and to sample the clipped facial image into the predetermined size to normalize the measured facial image;
a horizontal division configured to divide the normalized measured facial image into three equal regions horizontally which respectively represent an eye region, a nose region, and a mouth region and which each have a height equal to ⅔ the distance between the eyes; and a vertical division part configured to divide the normalized measured facial image into three equal regions vertically which respectively represent a left eye region, a nose region, and a right eye region and which each have a width equal to ⅔ the distance between the eyes;

a similarity vector creating unit configured to extract characteristic vectors from each of the sub-divided images of the normalized measured facial image and to create a similarity vector based on a degree of similarity between registered characteristic vectors associated with at least one of the stored facial images and that of the extracted characteristic vectors of the normalized measured facial image; and an authentication unit configured to input the similarity vector to the SVM classifier to perform authentication of the measured facial image.

7. The apparatus of claim 6, wherein the SVM comprises:

a first vector creator configured to normalize a stored facial image of the stored facial images to the predetermined size, to divide along horizontal and vertical directions the normalized stored facial image into a plurality of sub-divided images of the normalized stored facial image, and to extract characteristic vectors from the sub-divided images of the normalized stored facial image;

a second vector creator configured to compare the characteristic vectors from the normalized stored facial image against registered characteristic vectors of other divided images of the stored facial images to measure the degree of similarity and to normalize the measured degree of similarity of the compared characteristic vectors between −1 and +1; and an SVM learning part configured to designate a 1 into the similarity vector when comparing the stored facial image against itself, and to designate a −1 into the similarity vector when comparing the stored facial image against another stored facial image of the stored facial images to learn and create the SVM classifier.

8. The apparatus of claim 6, wherein the similarity vector creating unit comprises:

a PCA (principal component analysis) part configured to project the sub-divided images onto a PCA transform matrix to reduce the dimensions of the sub-divided images;

an LDA (linear discriminant analysis) part configured to project the sub-divided images onto an LDA transform matrix to extract the extracted characteristic vectors; and a similarity vector output part comparing the characteristic vectors with a characteristic vector registered in advance to measure a degree of similarity, and creating the similarity vector using a result of the measurement configured to compare the extracted characteristic vectors with registered characteristic vectors which are registered in advance to measure the degree of similarity, and to create the similarity vector.

* * * * *